(12) United States Patent
Kawasaki et al.

(10) Patent No.: US 9,792,508 B2
(45) Date of Patent: Oct. 17, 2017

(54) APPARATUS FOR RECOGNIZING LANE PARTITION LINES

(71) Applicant: DENSO CORPORATION, Kariya, Aichi-pref. (JP)

(72) Inventors: Naoki Kawasaki, Kariya (JP); Tomohiko Tsuruta, Aichi-ken (JP); Shunsuke Suzuki, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 6 days.

(21) Appl. No.: 14/886,918

(22) Filed: Oct. 19, 2015

(65) Prior Publication Data

US 2016/0110616 A1    Apr. 21, 2016

(30) Foreign Application Priority Data

Oct. 20, 2014  (JP) ................................. 2014-213326

(51) Int. Cl.
*G06K 9/00* (2006.01)
*H04N 7/18* (2006.01)
*B60R 1/00* (2006.01)
*G06K 9/32* (2006.01)

(52) U.S. Cl.
CPC ............ *G06K 9/00798* (2013.01); *B60R 1/00* (2013.01); *G06K 9/3233* (2013.01); *H04N 7/183* (2013.01); *B60R 2300/306* (2013.01)

(58) Field of Classification Search
None
See application file for complete search history.

(56) References Cited

U.S. PATENT DOCUMENTS

| | | | |
|---|---|---|---|
| 2001/0003436 A1* | 6/2001 | Yoshikawa | B60K 28/066 340/439 |
| 2005/0128061 A1* | 6/2005 | Yanai | B60R 1/00 340/435 |
| 2012/0166017 A1 | 6/2012 | Kobayashi et al. | |
| 2012/0221207 A1 | 8/2012 | Nakamura | |
| 2014/0136015 A1* | 5/2014 | Hayakawa | B60T 7/22 701/1 |
| 2014/0207325 A1* | 7/2014 | Mudalige | B62D 15/025 701/26 |
| 2014/0297181 A1* | 10/2014 | Kondo | G08G 1/09626 701/532 |

(Continued)

FOREIGN PATENT DOCUMENTS

| | | |
|---|---|---|
| JP | H0935198 | 2/1997 |
| JP | H0973545 | 3/1997 |

(Continued)

*Primary Examiner* — Shervin Nakhjavan
(74) *Attorney, Agent, or Firm* — Knobbe, Martens, Olson & Bear, LLP

(57) ABSTRACT

An apparatus for recognizing lane partition lines on opposite sides of a traveling lane in a processing area of a forward image captured by a camera mounted in a vehicle. In the apparatus, a lane change determiner is configured to determine whether or not there is a lane change made by the vehicle. A processing area changer is configured to, while it is determined by the lane change determiner that there is a lane change, change the processing area from a predefined processing area to a processing area that can accommodate the lane change.

14 Claims, 5 Drawing Sheets

(56) References Cited

U.S. PATENT DOCUMENTS

| | | | | |
|---|---|---|---|---|
| 2016/0091896 A1* | 3/2016 | Maruyama | ............ | B60W 10/04 |
| | | | | 701/23 |
| 2016/0101785 A1* | 4/2016 | Takahashi | .............. | B60K 35/00 |
| | | | | 701/31.4 |
| 2016/0137199 A1* | 5/2016 | Kuhne | .................. | B60W 50/14 |
| | | | | 701/41 |

FOREIGN PATENT DOCUMENTS

| JP | H11-053551 A | 2/1999 |
|---|---|---|
| JP | 2007-072512 A | 3/2007 |
| JP | 2007241468 | 9/2007 |
| JP | 2014048885 | 3/2014 |

* cited by examiner

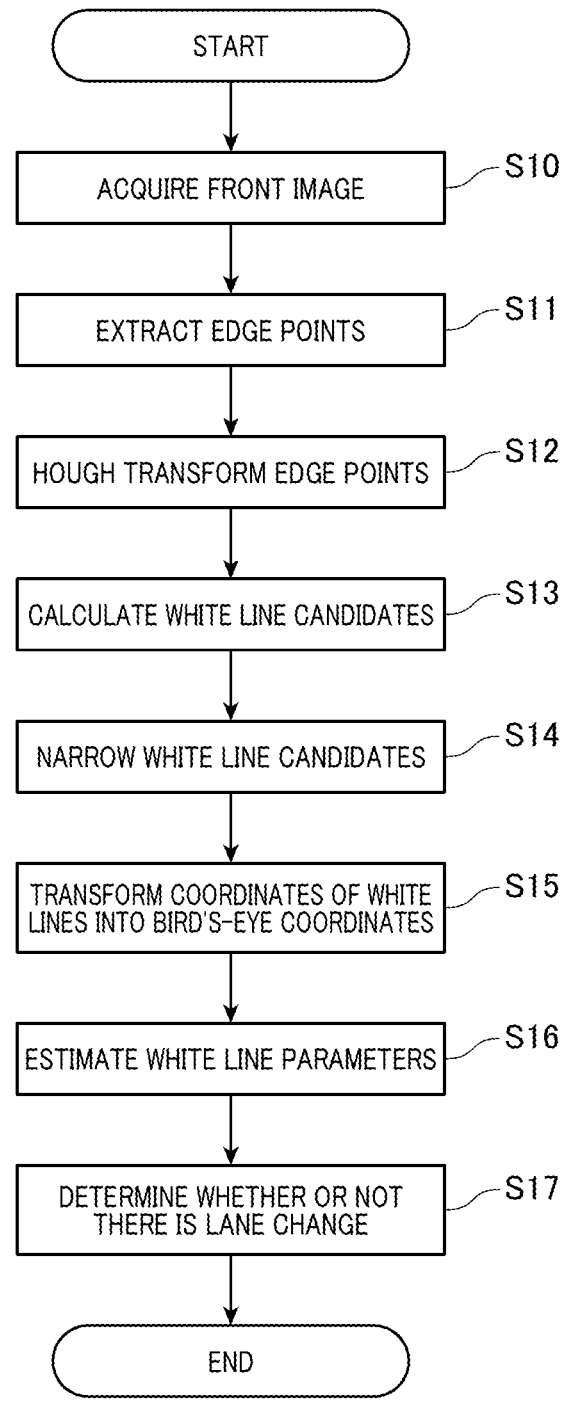

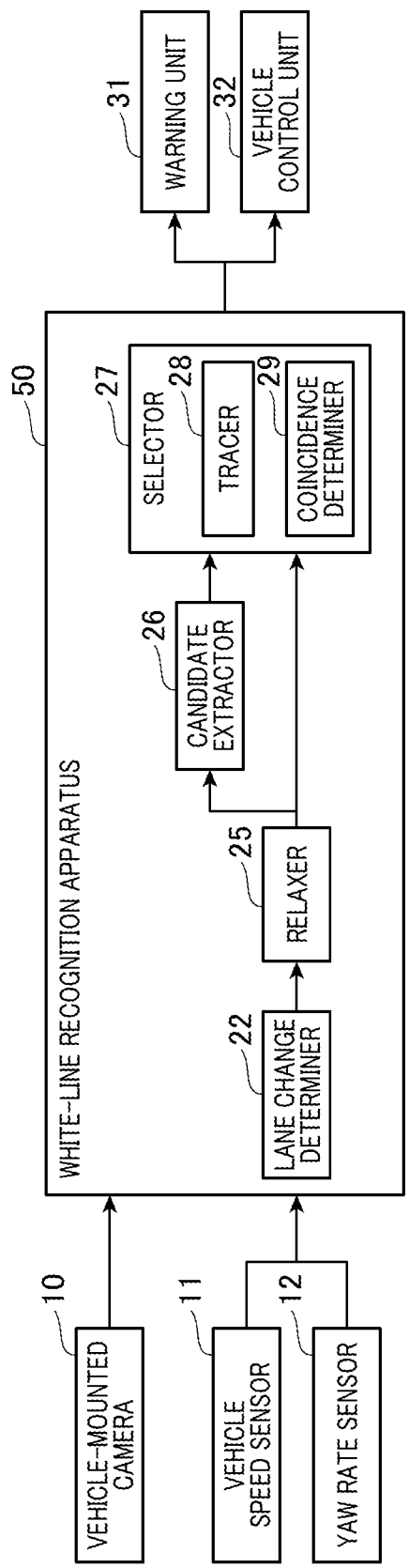

APPARATUS FOR RECOGNIZING LANE PARTITION LINES

CROSS-REFERENCE TO RELATED APPLICATION

This application is based on and claims the benefit of priority from earlier Japanese Patent Applications No. 2014-213326 filed Oct. 20, 2014, the descriptions of which are incorporated herein by reference.

BACKGROUND

Technical Field

The present invention relates to an apparatus for recognizing lane partition lines on opposite sides of a traveling lane based on an image captured by a vehicle-mounted camera.

Related Art

In recent years, there have been proposed various driving assistance apparatuses for recognizing lane partition lines on opposite sides of a traveling lane on a roadway based on an image captured by a vehicle-mounted camera. As an example, an apparatus as disclosed in Japanese Patent Application Laid-Open Publication No. 2007-72512 is configured to limit an image processing area to prevent an increase in processing load and misrecognition.

During a lane change, the vehicle moves away from one of lane partition lines of the traveling lane and approaches the other lane partition line. In addition, one of lane partition lines of a traveling lane after the lane change is farther away from the vehicle. Therefore, the one of the lane partition lines of the traveling lane before the lane change that is in a direction opposite a lane change direction and the one of the lane partition lines of the traveling lane after the lane change that is farther away from the traveling lane before the lane change are prone to get lost, which may result in a situation where only the lane partition line the vehicle approaches is recognized. As a result, a curvature recognized from the detected lane partition line is prone to vary, which leads to unstable partition line recognition. Steering control based on such unstable partition line recognition may cause a driver of the vehicle to feel uncomfortable.

In consideration of the foregoing, exemplary embodiments of the present invention are directed to providing an apparatus for recognizing lane partition lines on opposite sides of a traveling lane on a roadway, capable of rapidly detecting lane partition lines of a traveling lane after a lane change, thereby improving the stability of lane partition line recognition.

SUMMARY

In accordance with a first exemplary embodiment of the present invention, there is provided an apparatus for recognizing lane partition lines on opposite sides of a traveling lane in a processing area of a forward image captured by a camera mounted in a vehicle. The apparatus includes: a lane change determiner configured to determine whether or not there is a lane change made by the vehicle; and a processing area changer configured to, while it is determined by the lane change determiner that there is a lane change, change the processing area from a predefined processing area to a processing area that can accommodate the lane change.

In the first embodiment, lane partition lines of a traveling lane are recognized in the processing area in the forward image captured by the vehicle-mounted camera. While it is determined that there is lane change, the processing area is changed from the predefined area to the processing area that can accommodate the lane change. This allows the lane partition lines of the traveling lane after the lane change to be rapidly detected during the lane change, thereby improving the stability of lane partition line recognition.

In accordance with a second exemplary embodiment of the present invention, there is provided an apparatus for recognizing lane partition lines on opposite sides of a traveling lane based on a forward image captured by a camera mounted in a vehicle. The apparatus includes: a lane change determiner configured to determine whether or not there is a lane change made by the vehicle; and a relaxer configured to, while it is determined by the lane change determiner that there is a lane change, relax at least one condition for detecting the lane partition lines based on the forward image so as to facilitate detecting the lane partition lines.

In the second embodiment, the at least one condition for detecting lane partition lines of a traveling lane based on the image is relaxed so as to facilitate detecting the lane partition lines. This allows the lane partition lines appearing near the edges of the image, of the traveling lane after the lane change, to be rapidly detected during the lane change, thereby improving the stability of lane partition line recognition.

BRIEF DESCRIPTION OF THE DRAWINGS

FIG. 7 is a flowchart of a white line recognition process; and

FIG. 8 is a block diagram of a white line recognition apparatus in accordance with a second embodiment of the present invention.

DESCRIPTION OF SPECIFIC EMBODIMENTS

Figure 1:
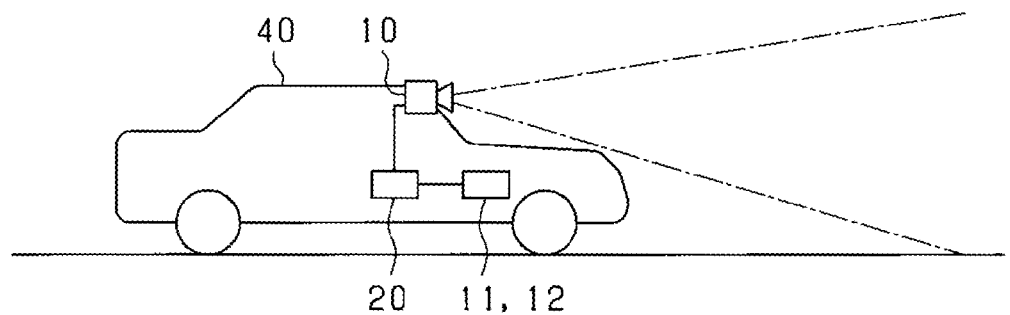
FIG. 1 is an example of a mounting position of a vehicle-mounted camera.

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals, and descriptions of them will not be repeated.

Figure 2:
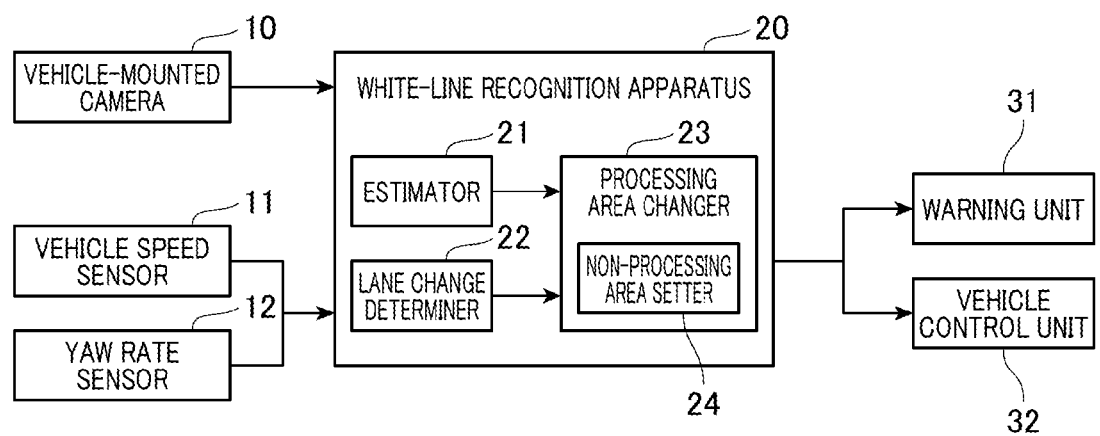
FIG. 2 is a block diagram of a white line recognition apparatus in accordance with a first embodiment of the present invention.

A white-line recognition apparatus (as a lane partition line recognition apparatus) 20 in accordance with one embodiment of the present invention will now be explained with reference to FIGS. 1 and 2. The white-line recognition apparatus 20 of the present embodiment is mounted in a vehicle 40 and configured to recognize white lines (as lane partition lines) that partition a roadway into traffic lanes based on a forward image captured by the vehicle-mounted camera 10.

The vehicle-mounted camera 10 may include at least one of a CCD image sensor, a CMOS image sensor and the like. As shown in FIG. 1, the vehicle-mounted camera 10 may be placed near the top end of a front windshield of the vehicle 40 to capture an image of an area that spans a pre-defined angular range horizontally with respect to a traveling direction. That is, the vehicle-mounted camera 10 captures an image of ambient surroundings including a roadway in front of the vehicle 40.

A vehicle speed sensor 11 is mounted in the vehicle 40 and configured to detect a speed of the vehicle 40. A yaw rate sensor 12 is mounted in the vehicle 40 and configured to detect a yaw rate of the vehicle 40.

A warning unit 31 and a vehicle control unit 32 are configured to assist the driver in driving the vehicle 40 based on white-line recognition results of the white-line recognition apparatus 20. The warning unit 31 is configured to output a lane departure alert when a lateral distance between a recognized white line and the vehicle 40 becomes equal to or less than a first distance or when the vehicle 40 has crossed the recognized white line. The vehicle control unit 32 is configured to control a steering and a brake of the vehicle 40 so that the vehicle 40 keeps traveling in a lane between the recognized adjacent white lines.

The white-line recognition apparatus 20 includes CPU, RAM, ROM, an input/output (I/O) interface, storage and other components. FIG. 2 shows a functional block diagram of the white-line recognition apparatus 20. The white-line recognition apparatus 20 includes an estimator 21, a lane change determiner 22, a processing area changer 23, a non-processing area setter 24. Functions of these functional blocks may be implemented by the CPU executing various programs stored in the ROM or the like.

The white-line recognition apparatus 20 is configured to extract white-line candidates from a processing area Ra that is a predefined area in the forward image captured by the vehicle-mounted camera 10, and narrow or refine the extracted white-line candidates to detect the white-line candidates having a maximum likelihood as white lines, and calculate white line parameters from each of the detected white lines.

Typically, the processing area Ra in the image is limited to a minimum area that allows left- and right white lines on opposite sides of the traveling lane to be detected. Enlargement of the processing area Ra allows detection of white lines in an adjacent lane. However, such enlargement may lead to misrecognition of the white lines and increase a processing load. Thus, the processing area Ra in the image is limited.

During lane change, however, the vehicle 40 moves away from a white line Wa and approaches a white line Wc in a lane change direction, where the white lines Wa and Wc are on opposite sides of the traveling lane before the lane change and the lane change direction is a direction from the white line Wa to the white line Wc. While approaching the white line Wc, the vehicle 40 is away from a white line Wb that is another white line of a traveling lane after the lane change. Therefore, during the lane change, the white line Wa and the white line Wb are prone to deviate from the processing area Ra, which may cause the white lines Wa and Wb to get lost. The white line Wa is farther away from the traveling lane after the lane change than the white line Wc is, where the white lines Wa and Wc are white lines on opposite sides of the traveling lane before the lane change. The white line Wb is farther away from the traveling lane before the lane change, where the white lines Wb and Wc are white lines on opposite sides of the traveling lane after the lane change. This may result in a situation where only the white line Wc is recognized, which may lead to unstable white line recognition.

Addressing this concern, it is desired to improve stability of white line recognition during the lane change. Improvement of stability of the white line recognition during the lane change needs a rapid switching from the state where the white lines Wa and Wc of the traveling lane before the lane change are both recognized to the state where the white line Wb and Wc of the traveling lane after the lane change are both recognized. Thus, it is desired to rapidly detect the white lines Wb and Wc of the traveling lane after the lane change while keeping the white line Wa and Wc of the traveling lane before the lane change detected. A measure will now be explained to improve the stability of the white line recognition during the lane change.

The lane change determiner 22 is configured to determine whether or not there is a lane change made by the vehicle 40. More specifically, the lane change determiner 22 is configured to, if the vehicle 40 is going to change the lane or the vehicle 40 is now changing the lane, determine that there is a lane change.

The processing area changer 23 is configured to change the processing area Ra from the predefined processing area to a processing area that can accommodate the lane change while it is determined by the lane change determiner 22 that there is a lane change. More specifically, the processing area changer 23 is configured to enlarge the processing area Ra in the lane change direction so as to include in the enlarged processing area the white line Wb of the traveling lane after the lane change, where the white line Wb is farther away from the traveling lane before the lane change than the white line Wc is. The processing area changer 23 is further configured to enlarge the processing area Ra in a direction opposite the lane change direction so as to include in the enlarged processing area the white line Wa of the traveling lane before the lane change, where the white line Wa is farther away from the traveling lane after the lane change than the white line Wc is.

Figure 3A:
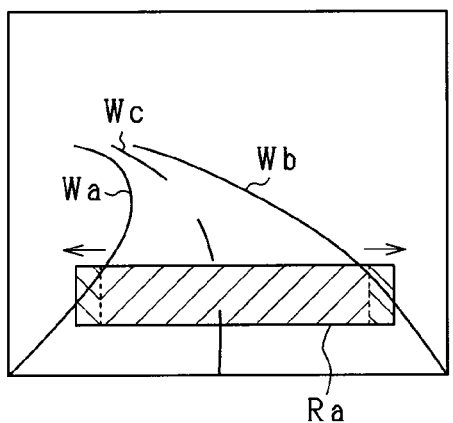
FIG. 3A is an example of a horizontally enlarged processing area in a forward image.
Figure 3B:
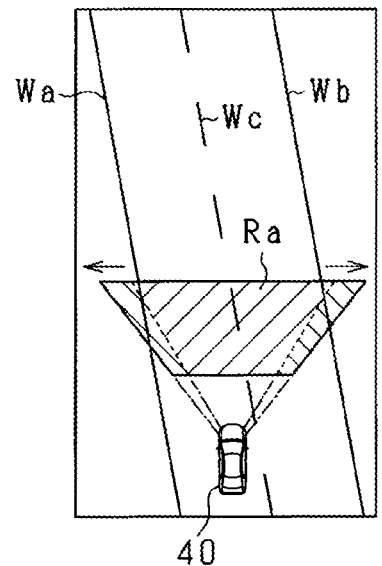
FIG. 3B is the processing area of FIG. 3A in a bird's-eye coordinate system.
Figure 4A:
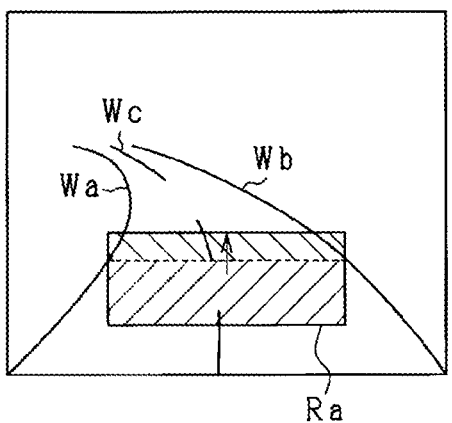
FIG. 4A is an example of a vertically enlarged processing area in the forward image.
Figure 4B:
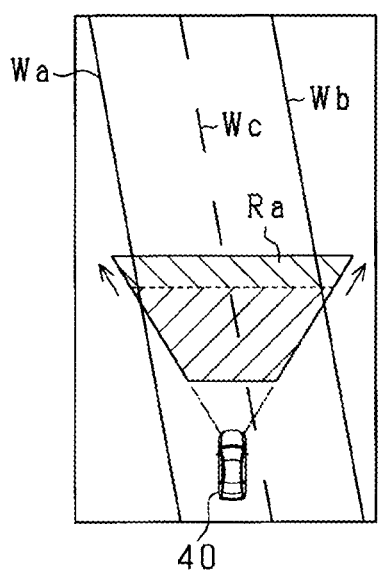
FIG. 4B is the processing area of FIG. 4A in the bird's-eye coordinate system.
Figure 5A:
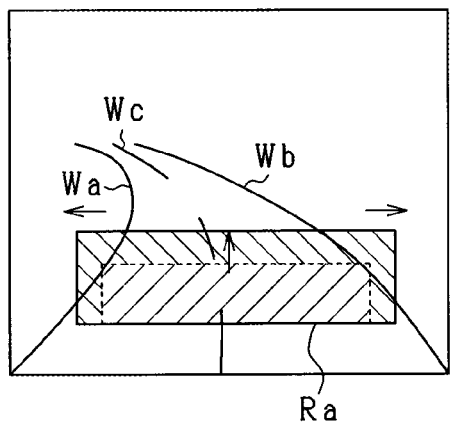
FIG. 5A is an example of a horizontally and vertically enlarged processing area in the forward image.
Figure 5B:
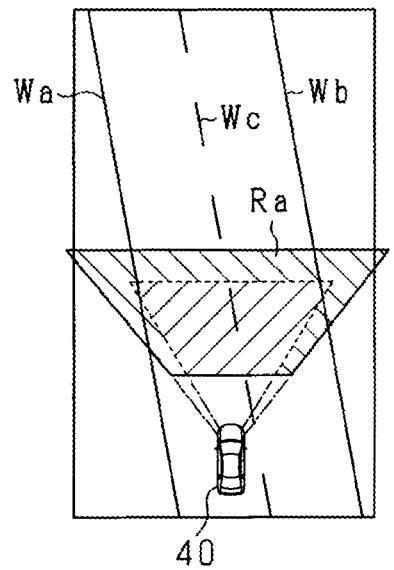
FIG. 5B is the processing area of FIG. 5A in the bird's-eye coordinate system.

FIGS. 3A, 4A, 5A show the forward image captured by the vehicle-mounted camera 10. In the forward image of each of these figures, the rectangle area lined by the solid line is the enlarged processing area Ra. A portion of the enlarged processing area Ra that is bordered by the broken line is the predefined processing area. FIGS. 3B, 4B, and 5B show the same enlarged processing area Ra in the bird's-eye coordinate system.

The processing area changer 23 may be configured to, as shown in FIGS. 3A and 3B, enlarge the processing area Ra in the horizontal direction of the image, or may be configured to, as shown in FIGS. 4A and 4B, enlarge the processing area Ra in the vertical direction of the image. With this configuration, lengths of portions of the white lines Wa and Wb included in the enlarged processing area Ra are increased, which can facilitate detecting the white lines Wa and Wb. As a result, the white lines Wa and Wc of the traveling lane before the lane change can be continued to be detected, and the white lines Wc and Wb of the traveling lane after the lane change can be rapidly detected. Thus, there can be accomplished the rapid switching from the state where the white lines Wa and Wc of the traveling lane before the lane change are both recognized to the state where the white line Wb and Wc of the traveling lane after the lane change are both recognized.

The processing area changer 23 may be configured to enlarge the processing area Ra in the horizontal and vertical directions of the image, as shown in FIG. 5. This can further facilitate detecting the white lines Wa and Wb.

Figure 6:
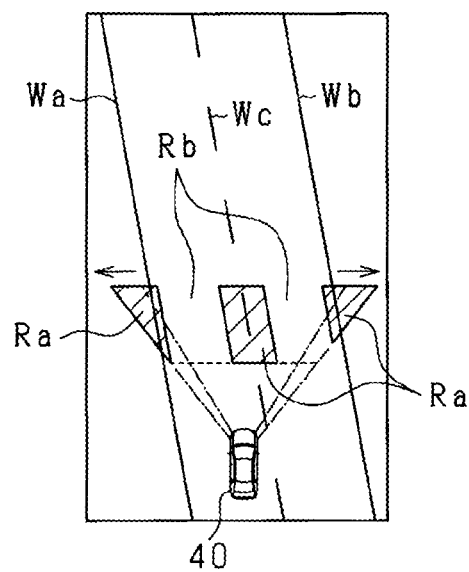
FIG. 6 is an example of processing areas and non-processing areas.

The enlargement of the processing area R alone, however, may lead to an increased processing load. Addressing this concern, as shown in FIG. 6, a non-processing area setter 24 may be included in the processing area changer 23. The non-processing area setter 24 is configured to set part of the enlarged processing area as a non-processing area or areas Rb, where a white line recognition process is not performed. The processing area changer 23 is configured to define the processing area or areas Ra as being an area or areas obtained by removing the non-processing area or areas Rb from the enlarged processing area. The non-processing area setter 24 may be configured to set an area or areas within the enlarged processing area other than an area or areas where a white line or lines are presumed to exist as the non-processing area or areas Rb. That is, the processing area changer 23 is configured to set an area or areas within the enlarged processing area where a white line or lines are presumed to exist as the processing area or areas Ra. The estimator 21 is configured to, based on previous white line recognition results and a detected vehicle speed and a detected yaw rate, estimate the area or areas within the enlarged processing area where a white line or lines exist (before removal of the non-processing areas Rb).

FIG. 6 shows the processing areas Ra obtained by removing the non-processing areas Rb from the horizontally enlarged processing area. Although not shown, the processing areas Ra may be obtained by removing the non-processing areas Rb from the vertically enlarged processing area.

A process for recognizing white lines (hereinafter also referred to as a white line recognition process) will now be explained with reference to a flowchart of FIG. 7. This process may be performed by the white line recognition apparatus 20 every time the vehicle-mounted camera 10 captures a forward image.

First, in step S10, a forward image captured by the vehicle-mounted camera 10 is acquired. Subsequently in step S11, edge points are extracted from the forward image by applying a sobel filter or the like to the processing area Ra of the forward image. More specifically, up edge points and down edge points constituting inner and outer outlines of a white line or lines are extracted on each of the left and right sides of the vehicle 40. If it is determined in the previous cycle that there is a lane change, then the processing area Ra is changed.

In step S12, the edge points extracted in step S11 are Hough transformed. In step S13, white-line (lane partition line) candidates are extracted based on inner and outer straight lines (as inner and outer outlines of the white line candidate) calculated by the Hough transformation that satisfy predefined conditions. Each white-line candidate must satisfy the predefined conditions including a condition that a number of Hough transform votes is greater than a predetermined number and a condition (referred to as a parallelism condition) that the parallelism between inner and outer outlines is less than a parallelism threshold. The parallelism between the inner and outer outlines of the white line candidate that are completely parallel to each other is zero.

Subsequently, in step S14, the white-line candidates calculated in step S13 are narrowed or refined to detect a white-line candidate having a maximum likelihood as a white line on each of the left and right sides of the vehicle 40. More specifically, a white line candidate satisfying a predefined white line condition to a highest degree is selected as a white-line candidate having a maximum likelihood that the white line candidate is a white line. For example, the white line condition is such that the white line candidate corresponding to the same white line is detected continuously to a continuation degree higher than a continuation threshold.

Subsequently, in step S15, coordinates of the white lines detected in step S14 are transformed into the bird's-eye coordinates. In step S16, white line parameters are estimated from the white lines in the bird's-eye coordinate system. The white line parameters include a lane curvature, a lateral position of the vehicle 40 in the lane, a tilt angle of the traveling lane to the vehicle 40, a lane width and others.

Subsequently, in step S17, it is determined whether or not there is a lane change. More specifically, if the vehicle 40 is going to change the lane or if the vehicle 40 is now changing the lane, it is determined that there is a lane change. For example, if an angle between the vehicle 40 and the recognized white line exceeds a predetermined angle, it is determined that the vehicle 40 is going to change the lane or the vehicle 40 is now changing the lane, thereby determining that there is a lane change. If it is determined that there is a lane change, it is determined whether the traveling lane is changed to the left or right adjacent lane. The angle between the vehicle 40 and the recognized white line can be calculated from the tilt angle of the traveling lane to the vehicle 40 as a white line parameter. Thereafter, the process ends.

The present embodiment described above can provide the following advantages.

(1a) While it is determined that there is a lane change, the processing area Ra may be changed from the predefined processing area to a processing area that can accommodate the lane change. This allows the white lines Wb and Wc on opposite sides of the traveling lane after the lane change to be rapidly detected during the lane change, and can improve the stability of the white line recognition.

(1b) While it is determined that there is a lane change, the processing area Ra may be enlarged in the lane change direction so as to include in the enlarged processing area the white line Wb of the traveling lane after the lane change, where the white line Wb is farther away from the traveling lane before the lane change than the white line Wc is. This allows the white lines Wc and Wb on opposite sides of the traveling lane after the lane change to be rapidly detected during the lane change, and can prevent a situation to occur where only the white line Wc is detected.

(1c) While it is determined that there is a lane change, the processing area Ra may be enlarged in a direction opposite the lane change direction so as to include in the enlarged processing area the white line Wa of the traveling lane before the lane change, where the white line Wa is farther away from the traveling lane after the lane change than the white line Wc is. This allows the white lines Wa and Wc on opposite sides of the traveling lane before the lane change to be kept detected during the lane change, and can prevent a situation where only the white line Wc is detected.

(1d) While it is determined that there is a lane change, the processing area Ra may be enlarged in the vertical direction of the image. This can facilitate detecting the white line Wb of the traveling lane after the lane change and/or the white line Wa of the traveling lane before the lane that may appear at an edge of the image.

(1e) While it is determined that there is a lane change, the processing area Ra may be enlarged in the horizontal direction of the image. This can facilitate detecting the white line Wb of the traveling lane after the lane change and/or the white line Wa of the traveling lane before the lane that may appear at an edge of the image.

(1f) The non-processing area or areas Rb, in which a white line recognition process is not performed, may be set in the enlarged processing area. The processing area or areas Ra may be defined as being an area or areas obtained by removing the non-processing area or areas Rb from the enlarged processing area. This allows the white line Wb of the traveling lane after the lane change to be rapidly detected during the lane change, and allows the white line Wa of the traveling lane before the lane change to be kept detected while reducing the processing load.

(1g) The area or areas within the enlarged processing area where a white line or lines exist are estimated based on previous white line recognition results. An area or areas within the enlarged processing area other than the estimated area or areas is set as the non-processing area or areas Rb. This can prevent the white line Wb of the traveling lane after the lane change and/or the white line Wa of the traveling lane before the lane change from being undetected while reducing the processing load.

(1h) If an angle between the vehicle 40 and the recognized white line exceeds a predetermined angle, the vehicle 40 is going to cross the recognized white line. Therefore, it may be determined that the vehicle 40 is going to change the lane or the vehicle 40 is now changing the lane.

Second Embodiment

In the first embodiment, the rapid detection of the white lines Wc and Wb of the traveling lane after the lane change is accomplished by changing the processing area Ra of the image during the lane change. In the present embodiment, while it is determined by the lane change determiner 22 that there is a lane change, the conditions for detecting the white lines are relaxed, thereby facilitating detecting the white lines during the lane change.

FIG. 8 shows a functional block diagram of a white-line recognition apparatus 50 together with its peripheral units. The white-line recognition apparatus 50 of the present embodiment is configured to recognize white lines (as lane partition lines) that partition a roadway into traffic lanes based on the forward image captured by the vehicle-mounted camera 10. The white-line recognition apparatus 50 includes is a microcomputer including CPU, RAM, ROM, an input/output (I/O) interface, a storage and other components. The white-line recognition apparatus 50 includes, as functional blocks, the lane change determiner 22, a relaxer 25, a candidate extractor 26, a selector 27, a tracer 28, and a coincidence determiner 29. Functions of these functional blocks may be implemented by the CPU executing various programs stored in the ROM or the like.

The candidate extractor 26 is configured to extract, from the forward image, the white-line candidates that satisfy the predefined conditions. The selector 27 includes a tracer 28 and a coincidence determiner 29, and is configured to select, from the white-line candidates extracted by the candidate extractor 26, a white line candidate satisfying a predefined white line condition to a highest degree as a white-line candidate having a maximum likelihood that the white line candidate is a white line, on each of the left and right sides of the vehicle 40. The white line condition is such that a white line candidate corresponding to the same white line is detected continuously to a continuation degree higher than a continuation threshold.

The tracer 28 is configured to, if a white line candidate corresponding to the same white line is extracted continuously to a continuation degree higher than the continuation threshold, detect the continuously extracted white line candidate as a white line. More specifically, the tracer 28 may be configured to, if a white line candidate corresponding to the same white line is extracted in a predetermined number (as the continuation threshold) or more of consecutive cycles, that is, in a predetermined number or more of consecutive frames, detect the continuously extracted white line candidate as a white line, or may be configured to, if a white line candidate corresponding to the same white line is extracted continuously over a distance greater than a predetermined distance (as the continuation threshold), detect the continuously extracted white line candidate as a white line. The coincidence determiner 29 is configured to, if an amount of deviation between a white-line candidate extracted by the candidate extractor 26 in the current cycle and a white-line candidate extracted in the previous cycle is less than a coincidence threshold, determine that these white-line candidates correspond to the same white line. The amount of deviation may be an amount of deviation (i.e., a separation) in the horizontal direction of the forward image.

The relaxer 25 is configured to, while it is determined that there is a lane change, relax the conditions for detecting a white line based on the forward image to facilitate detecting the white line. That is, the relaxer 25 is configured to relax the predetermined conditions for the candidate extractor 26 extract the white-line candidates to and the white line condition for the selector 27 to select the white-line candidate as a white line.

More specifically, the relaxer 25 is configured to, while it is determined that there is a lane change, more relax the parallelism condition for inner and outer outlines of the white line candidate nearer to the edges of the image. That is, the relaxer 25 is configured to, if it is determined in the previous cycle that there is a lane change, increase the parallelism threshold in step S13 of the flowchart in FIG. 7.

The accuracy of calculating positions and angles of the white-line candidate outlines decreases nearer to the edges of the image, which makes it more difficult to satisfy the parallelism condition as compared to the central portion of the forward image. Addressing this concern, the relaxer 25 is configured to, while it is determined that there is a lane change, more relax the parallelism condition nearer to the edges of the image. This can facilitate detecting the white line Wb appearing near the edges of the forward image, of the traveling lane after the lane change, and the white line Wa appearing near the edges of the forward image, of the traveling lane before the lane change.

The relaxer 25 is configured to, while it is determined that there is a lane change, relax the continuation condition for the white-line candidates. That is, the relaxer 25 is configured to, if it is determined in the previous cycle that there is a lane change, decrease the continuation threshold in step S14 of the flowchart in FIG. 7.

For the white lines appearing near the edges of the forward image, portions of such white lines included in the processing area have shorter lengths. Addressing this concern, the relaxer 25 is configured to, while it is determined that there is a lane change, decrease the continuation threshold. This can facilitate detecting the white line Wb appearing near the edges of the forward image, of the traveling lane after the lane change and the white line Wa appearing near the edges of the forward image, of the traveling lane before the lane change.

The relaxer 25 is configured to, while it is determined that there is a lane change, relax the coincidence condition for the white-line candidates. That is, the relaxer 25 is configured to, if it is determined in the previous cycle that there is a lane change, increase the continuation threshold in step S14 of the flowchart in FIG. 7.

The accuracy of calculating positions and angles of the white-line candidate outlines decreases nearer to the edges of the image, which makes it more difficult to satisfy the coincidence condition as compared to the central area of the forward image. Addressing this concern, the relaxer 25 is configured to, while it is determined that there is a lane change, relax the coincidence condition for the white-line candidates. This can facilitate detecting the white line Wb appearing near the edges of the forward image, of the traveling lane after the lane change, and the white line Wa appearing near the edges of the forward image, of the traveling lane before the lane change.

The present embodiment described above can provide the following advantages.

(2a) While it is determined that there is a lane change, the conditions for detecting the white lines based on the forward image are relaxed so as to facilitate detecting the white lines. This allows the white line Wb appearing near the edges of the forward image, of the traveling lane after the lane change, to be rapidly detected during the lane change, and allows the white line Wa appearing near the edges of the forward image, of the traveling lane before the lane change, to be kept detected during the lane change, thereby improving the stability of the white line recognition.

(2b) A white line candidate is extracted, and if the white line candidate corresponding to the same white line is extracted continuously to a continuation degree higher than the continuation threshold, the continuously extracted white line candidate is detected as a white line. In addition, while it is determined that there is a lane change, the continuation threshold is set lower, which can facilitate detecting the white line candidate as a white line. This allows the white line Wb appearing near the edges of the forward image, of the traveling lane after the lane change, to be rapidly detected during the lane change, and allows the white line Wa appearing near the edges of the forward image, of the traveling lane before the lane change, to be kept detected during the lane change.

(2c) If an amount of deviation between a white-line candidate extracted in the current cycle and a white-line candidate extracted in the previous cycle is less than the coincidence threshold, it is determined that these white-line candidates correspond to the same white line. While it is determined that there is a lane change, the continuation threshold is increased, which can facilitate determining that the white-line candidate extracted in the current cycle and the white-line candidate extracted in the previous cycle correspond to the same lane partition line (white line). This allows the white line Wb appearing near the edges of the forward image, of the traveling lane after the lane change, to be rapidly detected during the lane change, and allows the white line Wa appearing near the edges of the forward image, of the traveling lane before the lane change, to be kept detected during the lane change.

(2d) Inner and outer outlines of a white line or lines are extracted from the forward image, and white line candidates are extracted based on the inner and outer outlines such that the parallelism between the inner and outer outlines of each white line candidate is lower than the parallelism threshold. From the white line candidates thus extracted is selected a white line candidate as a white line. While it is determined that there is a lane change, the parallelism condition for the inner and outer outlines is more relaxed nearer to the edges of the forward image by increasing the parallelism threshold. Extracting the white line candidates nearer to the edges of the forward image is thus facilitated during the lane change. This allows the white line Wb appearing near the edges of the forward image, of the traveling lane after the lane change, to be rapidly detected during the lane change, and allows the white line Wa appearing near the edges of the forward image, of the traveling lane before the lane change, to be kept detected during the lane change.

Other Embodiments

There will now be explained some other embodiments that may be devised without departing from the spirit and scope of the present invention.

(i) In one alternative embodiment to the first embodiment, instead of using the non-processing areas Rb, a plurality of horizontal search lines may be used, where along each search line edge points are searched in the image. That is, the processing area is enlarged from the predefined processing area. Thereafter, the search lines are removed every predetermined vertical interval from the enlarged processing area, thereby defining the processing area Ra.

(ii) In one alternative embodiment to the first embodiment, although the processing load may be increased, no non-processing areas Rb may set in the processing area enlarged from the predefined area, thereby defining the processing area Ra.

(iii) In one alternative embodiment to the first embodiment, the processing area may be enlarged from the predefined area either in the lane change direction or in the direction opposite the lane change direction.

(iv) In one alternative embodiment to the first or second embodiment, the forward image may be an image cut from the image captured by the vehicle-mounted camera 10. The processing area Ra may be the entire forward image. In such an embodiment, during a lane change, the forward image may be enlarged.

(v) In one alternative embodiment to the second embodiment, at least one of the conditions for detecting the white lines of the traveling lane based on the forward image may be relaxed.

(vi) In one alternative embodiment to the first or second embodiment, both changing of the processing area Ra and relaxing of the conditions for detecting the white lines of the traveling lane based on the forward image may be performed. This can further improve the white line recognition efficiency.

(vii) In one alternative embodiment, if a distance between the vehicle 40 and the recognized white line decreases below a predetermined distance, it may be determined that there is a lane change. The distance between the vehicle 40 and the recognized white line can be calculated from the lateral displacement of the vehicle 40 in the traveling lane as a white line parameter.

(viii) In one alternative embodiment, if a lateral speed of the vehicle 40 exceeds a predetermined lateral speed, it may be determined that there is a lane change. The lateral speed of the vehicle 40 is a speed of the vehicle 40 in a horizontal direction of the traveling lane. The lateral speed of the vehicle 40 can be calculated from a time variation of the lateral displacement of the vehicle 40.

(ix) In one alternative embodiment, if a direction indicator of the vehicle 40 is activated during highway travel, it may be determined that there is a lane change. Typically, it is only when the vehicle 40 is going to change the lane that the driver activates the direction indicator during highway travel. Therefore, if the direction indicator is activated during highway travel, it may be determined that the vehicle 40 is going to change the lane or the vehicle 40 is now changing the lane.

What is claimed is:

1. An apparatus for recognizing lane partition lines on opposite sides of a traveling lane in a processing area of a forward image captured by a camera mounted in a vehicle, the apparatus comprising:
   a lane change determiner configured to determine, using a processor, whether or not there is a lane change made by the vehicle; and
   a processing area changer configured to, while it is determined by the lane change determiner that there is a lane change, change, using the processor, the processing area from a predefined processing area to a processing area that can accommodate the lane change,
   wherein the processing area changer is configured to enlarge the processing area in a lane change direction so as to include in the enlarged processing area one of lane partition lines on opposite sides of the traveling lane after the lane change that is farther away from the traveling lane before the lane change than the other of the lane partition lines of the traveling lane after the lane change is.

2. The apparatus of claim 1, wherein the processing area changer is configured to enlarge the processing area in a direction opposite a lane change direction so as to include in the enlarged processing area one of lane partition lines on opposite sides of the traveling lane before the lane change that is farther away from the traveling lane after the lane change than the other of the lane partition lines of the traveling lane before the lane change is.

3. The apparatus of claim 1, wherein the processing area changer is configured to enlarge the processing area in a vertical direction of the image.

4. The apparatus of claim 1, wherein the processing area changer is configured to enlarge the processing area in a horizontal direction of the image.

5. The apparatus of claim 1, wherein the processing area changer comprises a non-processing area setter configured to set part of the enlarged processing area as a non-processing area, in which non-processing area a lane partition line recognition process is not performed,
   wherein the processing area is an area obtained by removing the non-processing area from the enlarged processing area.

6. The apparatus of claim 5, further comprising an estimator configured to, based on previous lane partition line recognition results, estimate, using the processor, an area within the enlarged processing area, in which at least one white line exists,
   wherein the non-processing area setter is configured to set the non-processing area in an area within the enlarged processing area other than the area estimated by the estimator.

7. The apparatus of claim 1, further comprising a relaxer configured to, while it is determined by the lane change determiner that there is a lane change, relax, using the processor, at least one condition for detecting the lane partition lines based on the forward image so as to facilitate detecting the lane partition lines.

8. The apparatus of claim 1, wherein the lane change determiner is configured to, when an angle between the vehicle and one of the lane partition lines on opposite sides of the traveling lane exceeds a predetermined angle, determine that there is a lane change.

9. The apparatus of claim 1, wherein the lane change determiner is configured to, when a distance between the vehicle and one of the lane partition lines on opposite sides of the traveling lane decreases below a predetermined distance, determine that there is a lane change.

10. The apparatus of claim 1, wherein the lane change determiner is configured to, when a lateral speed of the vehicle that is a speed of the vehicle in a horizontal direction of the traveling lane exceeds a predetermined lateral speed, determine that there is a lane change.

11. An apparatus for recognizing lane partition lines on opposite sides of a traveling lane based on a forward image captured by a camera mounted in a vehicle, the apparatus comprising:
    a lane change determiner configured to determine, using a processor, whether or not there is a lane change made by the vehicle; and
    a relaxer configured to, while it is determined by the lane change determiner that there is a lane change, relax, using the processor, at least one condition for detecting the lane partition lines based on the forward image so as to facilitate detecting the lane partition lines.

12. The apparatus of claim 11, further comprising:
    a candidate extractor configured to extract, using the processor, lane partition line candidates from the forward image; and
    a tracer configured to, if a lane partition line candidate corresponding to the same partition line is extracted by the candidate extractor continuously to a continuation degree higher than a continuation threshold, detect, using the processor, the continuously extracted lane partition line candidate as a lane partition line,
    wherein the relaxer is configured to, while it is determined by the lane change determiner that there is a lane change, decrease the continuation threshold.

13. The apparatus of claim 11, further comprising:
    a candidate extractor configured to extract, using the processor, lane partition line candidates from the forward image; and
    a coincidence determiner configured to, if an amount of deviation between a first lane partition line candidate extracted by the candidate extractor in the current cycle and a second lane partition line candidate extracted by the candidate extractor in the previous cycle is less than a coincidence threshold, determine, using the processor, that the first and second lane partition line candidates correspond to the same lane partition line; and
    a tracer configured to, if a lane partition line candidate corresponding to the same lane partition line is extracted by the candidate extractor continuously to a continuation degree higher than the continuation threshold, detect the continuously extracted lane partition line candidate as a lane partition line,
    wherein the relaxer is configured to, while it is determined by the lane change determiner that there is a lane change, increase the continuation threshold.

14. The apparatus of claim 11, further comprising:
a candidate extractor configured to extract, using the processor, inner and outer outlines of a lane partition line from the forward image, and extract lane partition line candidates based on the inner and outer outlines such that the parallelism between the inner and outer outlines of each lane partition line candidate is lower than a parallelism threshold; and
a selector configured to select, using the processor, from the lane partition line candidates extracted by the candidate extractor, a lane partition line candidate as a lane partition line,
wherein the relaxer is configured to, while it is determined by the lane change determiner that there is a lane change, increase the parallelism threshold nearer to edges of the forward image.

* * * * *